T. L. TALIAFERRO.
HERMETIC SEAL FOR CONTAINERS.
APPLICATION FILED JUNE 21, 1920.
1,427,133.
Patented Aug. 29, 1922.
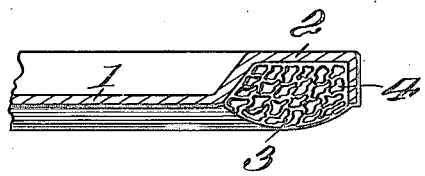
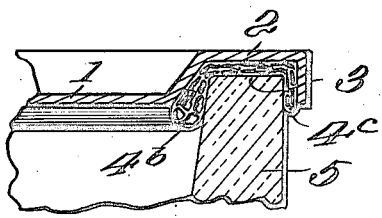
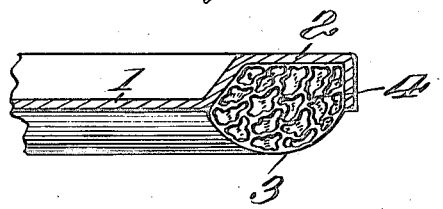
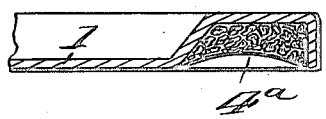
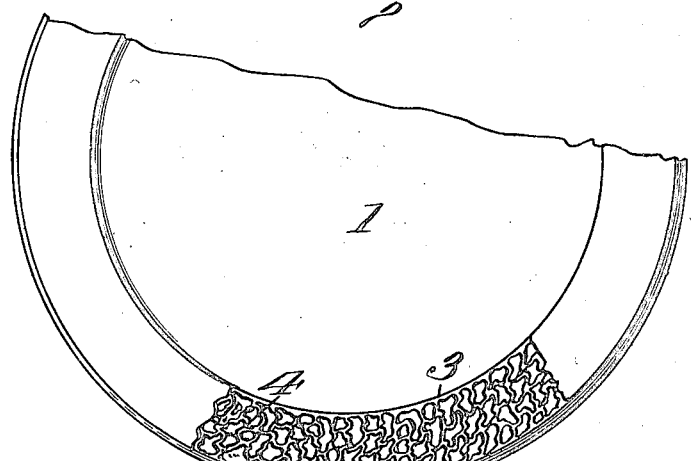
Inventor
Thomas Lucien Taliaferro
By Sturtevant Hudson
Attorneys

UNITED STATES PATENT OFFICE.

THOMAS LUCIEN TALIAFERRO, OF CHICAGO, ILLINOIS.

HERMETIC SEAL FOR CONTAINERS.

1,427,133. Specification of Letters Patent. Patented Aug. 29, 1922.

Application filed June 21, 1920. Serial No. 390,501.

*To all whom it may concern:*

Be it known that I, THOMAS L. TALIAFERRO, a citizen of the United States, residing at Chicago, in the county of Cook, State of Illinois, have invented certain new and useful Improvements in Hermetic Seals for Containers, of which the following is a description, reference being had to the accompanying drawing, and to the figures of reference marked thereon.

The invention relates to new and useful improvements in hermetic sealing devices for containers, and more particularly to a sealing device which is plastic.

An object of the invention is to provide a plastic sealing member which is readily shapable to conform to the irregularities of the surface being sealed so that the seal may be effected by comparatively light pressure, as for example, atmospheric pressure through the sealing by vacuum.

A further object of the invention is to provide a sealing member wherein the extent of surface over which the sealing member makes contact is extended to the maximum compared with the amount of sealing material used so as to further insure the effecting of a perfect seal.

A still further object of the invention is to provide a sealing member of plastic material wherein the body portion thereof contains permanent visible sponge-like cells, while the surface of the sealing device is substantially continuous, thus forming in effect, a sealing surface which is cushioned.

Still another object of the invention is to provide a sealing device which will soften slightly at comparatively low heat so that the heat incident to the contents of the goods being sealed will slightly soften the sealing member and thus aid in the bringing about of a perfect seal.

These and other objects will in part be obvious and will in part be hereinafter more fully disclosed.

In the drawings which show by way of illustration one embodiment of the invention:—

Figure 1 is a transverse sectional view through a portion of a cover for a container having my improved sealing material applied thereto;

Fig. 2 is a similar view showing the cover placed on a closed jar, and the reforming of the sealing material, resulting from the light pressure on the cover after it has been placed on the jar;

Fig 4 is a bottom plan view of the cover with the sealing ring applied thereto;

Fig. 3 is a view similar to Fig. 1 but showing the sponge-like cells much larger;

Fig. 5 is an enlarged bottom view of a portion of the cover with the sealing ring cut through to show the cells.

The invention is directed broadly to a sealing material which may be used in the hermetic closing of containers, whether the containers be formed of metal, glass, or any other material. The sealing material consists of a plastic base which is capable of being reshaped so as to make perfect contact with the surfaces being sealed, regardless of any irregularities contained therein. This sealing material in its preferred form consists of a rubber base, such as Pará rubber, to which has been added a suitable filler and a solvent, such as benzol. The whole is made into a plastic mass which may be formed by scraping and flowing into the desired shape for sealing a container, and preferably it is scraped or flowed directly on to the cover and adheres to and becomes a part of the cover. After the sealing material is placed on the cover, it is subjected to heat. The heat volatizes the solvent faster than it can escape, and thus causes the whole inner body portion of the mass of plastic material to be formed into permanent visible sponge-like cells. The size of these sponge-like cells depends upon the intensity of the heat. If the substance after having been placed on the cover is heated to a higher temperature, the volatile solvent will expand to a greater extent before it escapes and thus form larger cells. Under certain conditions, these cells become so large that the sealing member is more or less tube-like. The entire outer surface of the mass, however, of the sealing member is substantially closed and continuous so that in effect the surface of the sealing member is continuous and unbroken, while the body portion thereof is a sponge-like cellular mass.

Referring more in detail to the drawings, I have shown in Fig. 1 a metal cover 1 which is provided with a groove 2 and a sealing substance is indicated at 3. This sealing substance is in the form of a ring and is made in the manner above stated. A suitable amount of a plastic base such as Pará rubber is provided with a proper filler, and with a solvent such as benzol, and the whole made into a plastic mass. Preferably the plastic mass is of such consistency that it is not readily flowable, and is placed on the cover in ring form by scraping the material on to the cover. This may be accomplished by rolling the cover along a roll having a layer of the plastic material thereon with the edge so disposed relative to the roll as to scrape the material off from the roll on to the cover. The cover is then preferably subjected to slight heat and during this setting process, the cover is bottom side up so that the sealing substance is well supported by the cover. As shown in Fig. 3, the result of the heating and setting of the sealing substance is to form permanent sponge-like cells 4 which extend all through the inner body portion of the sealing ring. The surface of the sealing ring, is, however, substantially unbroken. These sponge-like cells are formed by the volatile solvent. The heating of the substance causes this solvent to volatilize faster than it can escape thus forming the sponge-like cells. If the heat is increased, the cells will increase in size, as shown in Fig. 4, wherein the cells are so large that the sealing ring is in effect, tubular. If the heat is maintained until the solvent is practically driven off, then the rubber becomes set in the expanded condition. In other words, the groove into which the substance has flowed may be substantially filled to the level of the groove, and during the heating, the substance swells or puffs to the condition shown in Figures 1 and 4, and remains set in this condition. If, however, the heat is of much less intensity, then the solvent will be driven off more slowly and the cells will be much smaller as indicated at $4^a$ in Fig. 5. Also the ring liner under the low conditions of heat will shrink somewhat in size as the solvent escapes and the liner will partake of the shape illustrated in this figure. In Fig. 2 of the drawings I have shown the cover applied to a jar 5, and it will be noted that the upper rounded edge of the glass jar forms a pocket, so to speak, in the sealing ring, and the sides of the sealing ring at $4^b$ and $4^c$ extend around completely enveloping and covering the upper edge of the jar and down on to the inner and outer side walls of the jar, thus very much extending the surface contact between the sealing ring and the jar from that obtained by the ordinary sealing ring.

Owing to the cellular structure of the sealing ring, the outer surface of the ring will very much more readily yield to the irregularities in the surface of the upper edge of the jar, and even though comparatively light pressure be exerted against the cover during the sealing operation. Thus a perfect seal may be obtained through atmospheric pressure in sealing by vacuum although the pressure is comparatively slight. This sealing material formed in the manner above stated softens slightly at a moderate heat so that the heat incident to the substance in the container will soften the surface of the sealing ring and thus further aid in the forming of a tight seal; as soon as the sealing ring cools it returns to normal conditions.

While I have shown in detail my invention as applied to the sealing of glass jars, and the sealing material in the form of a ring, it will be obvious that my improved sealing material may be in any form, and also that it may be used in connection with bottle caps for sealing bottles, can ends for sealing metal cans, and in various other forms and places. While I also prefer to form my sealing material so that it adheres to and becomes a part of either the cover or body portion of the container, from certain aspects of the invention, it may be independently formed and used as a sealing member.

It is obvious that minor changes in the details of construction may be made without departing from the spirit of the invention as set forth in the appended claims.

Having thus described the invention, what I claim as new and desire to secure by Letters-Patent, is:—

1. A hermetic sealing member for containers consisting of a plastic material having permanent sponge-like cells throughout the inner body portion thereof.

2. A hermetic sealing member for containers consisting of a plastic material having a substantially closed continuous sealing surface, and a sponge-like cellular inner body portion.

3. A hermetic sealing member for containers consisting of a plastic sealing ring having a sponge-like cellular inner body portion.

4. The combination of a cover for a container and a hermetic sealing member adhering thereto and consisting of a plastic base having a sponge-like cellular inner body portion.

5. The combination of a cover for a container and a hermetic sealing ring formed on the cover and consisting of a plastic material having a substantially closed continuous sealing surface and having sponge-like cells throughout the inner body portion thereof.

6. The combination of a cover having a groove formed therein, and a hermetic sealing ring formed in said groove and projecting beyond the surface of the cover, said sealing ring consisting of a plastic material having sponge-like cells throughout the inner body portion thereof.

7. A hermetic sealing member for containers consisting of a plastic rubber base having sponge-like cells throughout the inner body portion thereof.

8. A hermetic sealing member for containers consisting of a rubber plastic base, said sealing member having sponge-like cells located wholly within the body portion thereof and forming substantially a continuous sealing surface of rubber.

9. A hermetic sealing member for containers consisting of a rubber plastic base adapted to soften at a relatively low degree of heat and to harden upon cooling, said plastic base having a sponge-like cellular body portion.

In testimony whereof, I affix my signature.

THOMAS LUCIEN TALIAFERRO.